United States Patent
Galloway et al.

(10) Patent No.: US 10,475,541 B2
(45) Date of Patent: Nov. 12, 2019

(54) SIMPLE AND ROBUST IMPLOSION OF ICF TARGETS

(71) Applicant: Innoven Energy, LLC, Colorado Springs, CO (US)

(72) Inventors: Conner D. Galloway, Colorado Springs, CO (US); Alexander V. Valys, Colorado Springs, CO (US); Robert O. Hunter, Jr., Aspen, CO (US); David H. Sowle, Santa Maria, CA (US)

(73) Assignee: Innoven Energy, LLC, Colorado Springs, CO (US)

( * ) Notice: Subject to any disclaimer, the term of this patent is extended or adjusted under 35 U.S.C. 154(b) by 426 days.

(21) Appl. No.: 15/412,665

(22) Filed: Jan. 23, 2017

(65) Prior Publication Data
US 2017/0229194 A1    Aug. 10, 2017

Related U.S. Application Data

(60) Provisional application No. 62/388,312, filed on Jan. 22, 2016.

(51) Int. Cl.
*G21B 1/19* (2006.01)
*G21B 1/03* (2006.01)
*G21B 1/23* (2006.01)

(52) U.S. Cl.
CPC .............. *G21B 1/19* (2013.01); *G21B 1/03* (2013.01); *G21B 1/23* (2013.01); *Y02E 30/14* (2013.01); *Y02E 30/16* (2013.01)

(58) Field of Classification Search
CPC .... G21B 1/19; G21B 1/03; G21B 1/23; Y02E 30/14; Y02E 30/16
See application file for complete search history.

(56) References Cited

U.S. PATENT DOCUMENTS

| 4,034,032 A | 7/1977 | Hendricks |
| 4,263,095 A * | 4/1981 | Thode ............... G21B 1/19 376/105 |

(Continued)

FOREIGN PATENT DOCUMENTS

| EP | 2572359 B1 * | 12/2017 |
| GB | 2496250 A | 5/2013 |

(Continued)

OTHER PUBLICATIONS

Ramirez, J. J., et al. "A Light Ion Beam Driver for the Laboratory Microfusion Facility+." Fusion Technology 19.3P2A (1991): 664-668. <https://www.osti.gov/servlets/purl/6376642>.*

(Continued)

*Primary Examiner* — Lily C Garner
(74) *Attorney, Agent, or Firm* — Kilpatrick Townsend & Stockton, LLP

(57) ABSTRACT

A method of imploding an Inertial Confinement Fusion (ICF) target may include directing laser energy into a hohlraum, where a target is disposed within the hohlraum that includes an ablator layer, a shell disposed within the ablator layer, and a fuel region disposed within the shell. The method may also include ablating the ablator layer in response to the laser energy being directed into the hohlraum, and generating a single shockwave that is driven inward through the ablator layer. The method may further include impulsively accelerating the shell inward when hit by the single shockwave, and compressing the fuel region by the inward acceleration of the shell.

8 Claims, 5 Drawing Sheets

(56) References Cited

U.S. PATENT DOCUMENTS

| | | | |
|---|---|---|---|
| 4,525,323 A | 6/1985 | Bangerter et al. | |
| 2009/0147905 A1* | 6/2009 | Janssen | G21B 3/00 376/150 |
| 2013/0064340 A1 | 3/2013 | Latkowski et al. | |
| 2014/0044226 A1 | 2/2014 | Campbell et al. | |

FOREIGN PATENT DOCUMENTS

| | | |
|---|---|---|
| WO | 2011146113 A1 | 11/2011 |
| WO | 2017151237 A3 | 11/2017 |

OTHER PUBLICATIONS

Laser—Plasma Interactions in Long-Scale-Length Plasmas Under Direct-Drive National Ignition Facility Conditions, LLE Review, vol. 77, Jan. 2000, pp. 1-236.

Optimization of Deposition Uniformity for Large-Aperture NIF Substrates in a Planetary Rotation System, LLE Review, vol. 94, 2003, pp. 67-138.

Abdou et al., Critical Technical Issues and Evaluation and Comparison Studies for Inertial Fusion Energy Reactors, Fusion Engineering and Design, vol. 23, 1993, pp. 251-297.

Amendt et al., An Indirect-Drive Non-Cryogenic Double-Shell Path to $1\omega$ Nd-laser Hybrid Inertial Fusion-Fission Energy, Nucl. Fusion, vol. 50, No. 10, 2010, pp. 1-4.

Amendt et al., Indirect-Drive Noncryogenic Double-Shell Ignition Targets for the National Ignition Facility: Design and Analysis, Physics of Plasmas, American Institute of Physics, vol. 9, No. 5, May 2002, pp. 2221-2233.

Amendt et al., Modified Bell-Plesset Effect with Compressibility: Application to Double-Shell Ignition Target Designs, Physics of Plasmas, vol. 10, No. 3, Mar. 2003, pp. 820-829.

Atzeni, 2-D Lagrangian Studies of Symmetry and Stability of Laser Fusion Targets, Computer Physics Communications, vol. 43, 1986, pp. 107-124.

Atzeni et al., Burn Performance of Fast Ignited, Tritium-Poor ICF Fuels, Nuclear Fusion, vol. 37, No. 12, 1997, pp. 1665-1677.

Atzeni et al., Fluid and Kinetic Simulation of Inertial Confinement Fusion Plasmas, Computer Physics Communications, vol. 169, 2005, pp. 153-159.

Azechi et al., Formation of Initial Perturbation of Rayleigh-Taylor Instability in Supernovae and Laser-Irradiated Targets—Is there any Similarity? The Astrophysical Journal Supplement Series, vol. 127, Apr. 2000, pp. 219-225.

Azechi et al., Model for Cannonball-Like Acceleration of Laser-Irradiated Targets, Japanese journal of Applied Physics, vol. 20, No. 7, Jul. 1981, pp. L477-L480.

Barrios et al., Electron Temperature Measurements Inside the Ablating Plasma of Gas-filled Hohlraums at the National Ignition Facility, Physics of Plasmas, vol. 23, 2016, pp. 056307-1-056307-7.

Bartel et al., Microfireballs in Stratified Target Chamber Gases in the Light Ion Target Development Facility, Final Report for the Period Sep. 9, 1983 to Sep. 30, 1985, Fusion Technology Institute, Sep. 1985, 24 pages.

Basko, A 6 MJ Spherical Hohlraum Target for Heavy Ion Inertial Fusion, Nuclear Fusion, vol. 39, No. 8, Aug. 1999, pp. 1031-1040.

Basko, An Improved Version of the View Factor Method for Simulating Inertial Confinement Fusion Hohlraums, Phys. Plasmas, vol. 3, No. 11, Nov. 1996, pp. 4148-4155.

Basko, New Developments in the Theory of ICF Targets, and Fast Ignition with Heavy Ions, Plasma Physics and Controlled Fusion, vol. 45, 2003, pp. A125-A132.

Bates et al., Simulations of High-Gain Shock-Ignited Inertial-Confinement-Fusion Implosions using Less than 1 MJ of Direct KrF Laser Energy, High Energy Density Physics, vol. 6, Issue 2, Dec. 3, 2009, 10 pages.

Betti, High-Z Ablator Targets for Direct-Drive Inertial Confinement Fusion, 54th Annual Meeting of the American Physical Society, Division of Plasma Physics, Oct. 29-Nov. 2, 2012, 15 pages.

Betti et al., Theory of the Deceleration Phase Rayleigh—Taylor Instability, 42nd Annual Meeting of the American Physical Society Division of Plasma Physics, Oct. 23-27, 2000, 17 pages.

Bodner, Critical Elements of High Gain Laser Fusion, Journal of Fusion Energy, Review Paper, vol. 1, No. 3, 1981, pp. 221-240.

Bodner et al., High-Gain Direct-Drive Target Design for Laser Fusion, Physics of Plasmas, 2000, pp. 1-5.

Bodner et al., Overview of New High Gain Target Design for a Laser Fusion Power Plant, Fusion Engineering and Design, vol. 60, 2002, pp. 93-98.

Boehly, The Evolution of Surface Defects Driven by Shock Waves, 54th Annual Meeting of the American Physical Society Division of Plasma Physics, Oct. 29-Nov. 2, 2012, 13 pages.

Booth et al., Prospects of Generating Power with Laser-Driven Fusion, Proceedings of the IEEE, vol. 64, No. 10, Oct. 1976, pp. 1460-1482.

Bose, Hydrodynamic Scaling of the Deceleration-Phase Rayleigh-Taylor Instability, 55th Annual Meeting of the American Physical Society Division of Plasma Physics, Nov. 11-13, 2013, 14 pages.

Bourne et al., Computational Design of Recovery Experiments for Ductile Metals, Proc. R. Soc. A, vol. 461, 2005, pp. 3297-3312.

Bradley et al., ASC Simulations of 2014 and 2015 2-Shock Campaign Shots, NEDPC 2015 Proceedings, Nuclear Explosives Design Physics Conference, 2015, 8 pages.

Brueckner et al., Laser-Driven Fusion, Reviews of Modern Physics, vol. 46, No. 2, Apr. 1974, pp. 325-367.

Bugrov et al., Interaction of a High-Power Laser Beam with Low-Density Porous Media, Journal of Experimental and Theoretical Physics, vol. 84, No. 3, Mar. 1997, pp. 497-505.

Buttler et al., The Study of High-Speed Surface Dynamics using a Pulsed Proton Beam, AIP Conference Proceedings on the Shock Compression of Condensed Matter, 2013, 5 pages.

Buttler et al., Transport of Particulate Matter from a Shocked Interface, AIP Conference on Shock Compression of Condensed Matter, Jun.-Jul. 2011, 10 pages.

Buttler et al., Unstable Richtmyer-meshkov Growth of Solid and Liquid Metals in Vacuum, J. Fluid Mech., vol. 703, 2012, pp. 60-84.

Callahan et al., A Distributed Radiator, Heavy Ion Target Driven by Gaussian Beams in a Multibeam Illumination Geometry, Nuclear Fusion, vol. 39, No. 7, 1999, pp. 883-891.

Callahan et al., Advances in Target Design for Heavy-Ion Fusion, 32nd European Physical Society Plasma Physics Conference Barcelona, Spain, 2005, 18 pages.

Caruso et al., Physical Processes in a Laser-greenhouse Target: Experimental Results, Theoretical Models, and Numerical Calculations, Journal of Russian Laser Research, vol. 21, No. 4, 2000, pp. 335-369.

Casey et al., Reduced Instability Growth With High-adiabat Highfoot Implosions at the National Ignition Facility, Phys Rev E Stat Nonlin Soft Matter Phys., vol. 90, No. 1, 2014, 5 pages.

Cauble et al., Demonstration of 0.75 Gbar Planar Shocks in X-ray Driven Colliding Foils, Phys Rev Lett., vol. 70, No. 14, 1993, 5 pages.

Cerjan, Integrated Diagnostic Analysis of ICF Capsule Performance, Lawrence Livermore National Laboratory, DPP-APS Annual Meeting, Oct. 29, 2012, 24 pages.

Cerjan et al., Integrated Diagnostic Analysis of Inertial Confinement Fusion Capsule Performance, Physics of Plasmas, vol. 20, 2013, pp. 056319-1-056319-9.

Chu, The Electron Cyclotron Maser, Reviews of Modern Physics, vol. 76, 2004, 52 pages.

Clark et al., Detailed Implosion Modeling of Deuterium-tritium Layered Experiments on the National Ignition Facility, Physics of Plasmas, vol. 20, 2013, pp. 056318-1-056318-14.

Clark, Detailed Implosion Modeling of DT-Layered Experiments on the National Ignition Facility, 54th APS-DPP Meeting, Oct. 29, 2012, 31 pages.

(56) References Cited

OTHER PUBLICATIONS

Clark et al., Progress in Modeling Ignition Implosion Experiments on the National Ignition Facility, 8th International Conference on Inertial Fusion Sciences and Applications Nara, Japan, Oct. 2013, 6 pages.
Clark et al., Radiation Hydrodynamics Modeling of the Highest Compression Inertial Confinement Fusion Ignition Experiment From the National Ignition Campaign, Physics of Plasmas, vol. 22, 2015, pp. 022703-1-022703-18.
Dimonte, Nonlinear Hydrodynamics, Instabilities and Turbulent Mix, Workshop on Scientific Opportunities in High Energy Density Plasma Physics, Aug. 25-27, 2008, 32 pages.
Dittrich et al., Design of a High-Foot High-Adiabat ICF Capsule for the National Ignition Facility, Phys Rev Lett., vol. 112, No. 5, 2014, pp. 055002-1-055002-5.
Doeppner, Mix in Cryogenic Dt Layered Implosions on the NIF, Presentation to the 54th Annual Meeting of the APS Division of Plasma Physics Providence, 2012, 32 pages.
Eggert, Shock and Ramp Compression Experiments: Recent Developments, European XFEL HED instrument user workshop Hamburg, Germany, 2014, 45 pages.
Eliezer et al., The Physics of Directly Driven Targets, Nuclear Fusion by Inertial Confinement: A Comprehensive Treatise, 1993, pp. 43-71.
Engelstad et al., Near Term Icf Target Test Chambers, 1996, 52 pages.
Fittinghoff et al., The Neutron Imaging System Fielded at the National Ignition Facility, EPJ Web of Conferences, vol. 59, 2013, pp. 13016-p. 1-13016-p. 5.
Fong et al., Stability of Converging Shock Waves, Physics of Fluids, vol. 22, No. 3, 1979, pp. 416-421.
Fujita et al., Implosion Property of Cannonball Target at 10.6 μm Laser Wavelength, Japanese Journal of Applied Physics, vol. 25, No. 2, Feb. 1986, pp. L145-LI47.
Fung et al., Ejecta Modeling in the Flag Hydrocode, 11th US National Congress on Computational Mechanics Minneapolis, Minnesota, 2011, 13 pages.
Gamaly, Hydrodynamic Instability of Target Implosion in Icf, Nuclear Fusion by Inertial Confinement: A Comprehensive Treatise, 1993, pp. 321-349.
Glenzer et al., Cryogenic Thermonuclear Fuel Implosions on the National Ignition Facility, Phys. of Plasmas, vol. 19, 2012, pp. 056318-1-056318-15.
Glenzer et al., First Implosion Experiments With Cryogenic Thermonuclear Fuel on the National Ignition Facility, Plasma Phys. Control. Fusion, vol. 54, 2012, pp. 1-13.
Goldstein, Science of Fusion Ignition on NIF, U.S. Department of Energy by Lawrence Livermore National Laboratory, May 22-24, 2012, 111 pages.
Grim et al., Nuclear Imaging of the Fuel Assembly in Ignition Experiments, Physics of Plasmas, vol. 20, 2012, 30 pages.
Grim et al., Nuclear Imaging of the Fuel Assembly in Ignition Experiments a), Phys. Plasmas, vol. 20, 2013, pp. 056320-1-056320-12.
Haan et al., Design and modeling of ignition targets for the National Ignition Facility, Physics of Plasmas, vol. 2, No. 6, Jun. 1995, pp. 2480-2487.
Haan et al., Instability Growth Seeded by Oxygen in CH Shells on the National Ignition Facility, Physics of Plasmas, 2014, 30 pages.
Haan et al., Point design targets, specifications, and requirements for the 2010 ignition campaign on the National Ignition Facility, Physics of Plasmas, vol. 18, 2011, pp. 051001-1-051001-47.
Hammerberg et al., A Class of Ejecta Transport Test Problems, Necdc 2010 Conference, Los Alamos, 2011, 11 pages.
Hammerberg et al., Transport of Particle Matter From a Shocked Interface, American Physical Society Mar. Meeting, 2011, 17 pages.
Hibbard et al., Precision Manufacturing of Inertial Confinement Fusion Double Shell Laser Targets for Omega, Fusion Science and Technology, vol. 45, Mar. 2004, pp. 117-123.
Hicks et al., Implosion dynamics measurements at the National Ignition Facility, Phys. Plasmas, vol. 19, 2012, 27 pages.
Hohenberger, Polar-direct-drive experiments on the National Ignition Facility, Physics of Plasmas, vol. 22, 2015, 16 pages.
Hurricane et al., The high-foot implosion campaign on the National Ignition Facility, Physics of Plasmas, vol. 21, 2014, 15 pages.
Izawa et al., Target Fabrication, Nuclear Fusion by Inertial Confinement: A Comprehensive Treatise, 1993, pp. 515-553.
Johnson et al., Neutron spectrometry—An essential tool for diagnosing implosions at the National Ignition Facility (invited), Review of Scientific Instruments, vol. 83, 2012, 7 pages.
Kane et al., Interface Imprinting by a Rippled Shock using an Intense Laser, Physical Review E, vol. 63, 2001, 4 pages.
Karasik, Inertial Fusion Energy with Direct Drive and KrF Lasers, Plasma Physics Division, U.S. Naval Research Laboratory, 2013, 46 pages.
Karow et al., Particle-Beam-Driven Icf Experiments, Nuclear Fusion by Inertial Confinement: A Comprehensive Treatise, Chapter 23, 1993, pp. 597-614.
Keane, National Ignition Facility High-Energy-Density and Inertial Confinement Fusion Peer-Review Panel (PRP) Final Report, NIF HED/ICF Peer-Review Panel Final Report, Lawrence Livermore National Laboratory, 2014, 32 pages.
Kessler et al., Icf Reactors—Conceptual Design Studies, Nuclear Fusion by Inertial Confinement; A Comprehensive Treatise, Chapter 25, 1993, pp. 673-723.
Kindel et al., Double-Shell Target Designs for the Los Alamos Scientific Laboratory Eight-beam Laser System, 1978, 14 pages.
Kirkwood et al., A Review of Laser-plasma Interaction Physics of Indirect-Drive Fusion, Plasma Phys. Control. Fusion, vol. 55, No. 10, Sep. 12, 2013, 27 pages.
Kirkwood et al., Producing High Energy ns Pump Beams for Raman Amplification of Short Pulses using SBS Beam Combination, Presentation at IZEST, 2013, 22 pages.
Kitagawa et al., Soft-X-Ray Emission from 1 μm Laser-Irradiated Cannonball Target, Japanese Journal of Applied Physics, vol. 25, Part 2, No. 3, Feb. 22, 1986, pp. L171-L174.
Kline et al., Demonstration of an Optical Mixing Technique to Drive Kinetic Electrostatic Electron Nonlinear Waves in Laser Produced Plasmas, 2012, 13 pages.
Kline, Hohlraum Drive and Implosion Velocity Scaling to 500 Tw Laser Drive on Nif, 54th Annual Meeting of the APS Division of Plasma Physics, 2012, 40 pages.
Knauer et al., Neutron Spectra Measured with Time-of-Flight Detectors on the National Ignition Facility, Division of Plasma Physics, 2011, 17 pages.
Krauser et al., Ignition Target Design and Robustness Studies for the National Ignition Facility, Physics of Plasmas, vol. 3, No. 5, Jan. 25, 1996, pp. 2084-2093.
Kritcher et al., Metrics for Long Wavelength Asymmetries in Inertial Confinement Fusion Implosions on the National Ignition Facility, Physics of Plasmas, vol. 21, Issue 4, 2014, pp. 042708-1-042708-10.
Laffite et al., Time History Prediction of Direct-drive Implosions on the Omega Facility, Physics of Plasmas, vol. 23, Issue 1, Dec. 2016, pp. 012706-1-012706-6.
Lafon, Hydrodynamic Stability of Direct-Drive Targets with High-Z Ablators, 2012, 12 pages.
Lindl, Development of the Indirect-Drive Approach to Inertial Confinement Fusion and the Target Physics Basis for Ignition and Gain, Physics of Plasmas, vol. 2, Issue 11, Jun. 1995, pp. 3933-4024.
Lindl et al., The Physics Basis for Ignition Using Indirect-Drive Targets on the National Ignition Facility, Physics of Plasmas, vol. 11, Issue 2, Feb. 2004, pp. 339-491.
Linford et al., Design Descriptions of the Prometheus-L and -H Inertial Fusion Energy Drivers, Fusion Engineering and Design, vol. 25, 1994, pp. 111-124.
Loomis, Summaries of FY13 LANL Experimental Campaigns at the OMEGA Laser Facility, Los Alamos National Laboratory, Laboratory for Laser Energetics Annual Report, Oct. 3, 2013, 17 pages.

(56) References Cited

OTHER PUBLICATIONS

Ma et al., Onset of Hydrodynamic Mix in High-Velocity, Highly Compressed Inertial Confinement Fusion Implosions, Physical Review Letters, vol. 111, No. 8, American Physical Society, Aug. 23, 2013, pp. 085004-1-085004-5.

Ma et al., Thin Shell, High Velocity Inertial Confinement Fusion Implosions on the National Ignition Facility, Physical Review Letters, vol. 114, No. 14, American Physical Society, Apr. 10, 2015, pp. 145004-1-145004-6.

Maclaren et al., Novel Characterization of Capsule X-Ray Drive at the National Ignition Facility, Physical Review Letters, vol. 112, No. 10, Mar. 14, 2014, pp. 105003-1-105003-5.

Martinez-Val et al., An Introduction to Nuclear Fusion by Inertial Confinement, Nuclear Fusion by Inertial Confinement: A Comprehensive Treatise, Chapter 1, 1993, 40 pages.

McClellan, Double-Shelled Target Simulations with Lasnex, Lawrence Livermore Laboratory, Oct. 24, 1978, 19 pages.

McCrory, Laser-Driven Icf Experiments, Nuclear Fusion by Inertial Confinement: A Comprehensive Treatise, Chapter 22, 1993, pp. 555-596.

Meezan, Inflight Properties of NIF Ignition Capsules Inferred from Convergent Ablator Experiments, 2012, 35 pages.

Merrill et al., The Neutron Imaging Diagnostic at NIF (Invited)a), Review of Scientific Instruments, vol. 83, No. 10, 2012, pp. 10D317-1-10D317-6.

Metzler et al., Target Study for Heavy Ion Beam Fusion†, Laser and Particle Beams, vol. 2, Part 1, 1984, pp. 27-48.

Molvig et al., Low Convergence Path to Fusion Ignition, Los Alamos National Laboratory, 2016, 28 pages.

Montgomery et al., LANL Double Shell Design and Preliminary Results, PSS/DS Workshop 2025, Los Alamos, Jan. 25-26, 2016, 30 pages.

Moses et al., High Energy Density Simulations for Inertial Fusion Energy Reactor Design, 16th ANS Topical Meeting on Fusion Energy, Sep. 14-16, 2004, 8 pages.

Murakami et al., Indirectly Driven Targets for Inertial Confinement Fusion, Nuclear Fusion, vol. 31, No. 7, 1991, pp. 1315-1331.

Nakai et al., Nuclear Aspects and Design of an Inertial Confinement Fusion Reactor, Fusion Engineering and Design, vol. 16, 1991, pp. 173-182.

National Research Council, An Assessment of the Prospects for Inertial Fusion Energy, Retrieved from internet at: http://www.nap.edu/catalog.php?record_id=18289, 2013, 247 pages.

National Research Council, Assessment of Inertial Confinement Fusion Targets, 2013, 119 pages.

Nietiadi et al., Sputtering of Si Nanospheres, Physical Review, vol. 90, No. 4, 2014, pp. 045417-1-045417-9.

Nikroo, Target Fabrication for NIF and Inertial Fusion Energy (IFE), 2013, 23 pages.

Nishimura et al., Radiation-Driven Cannonball Targets for High-Convergence Implosions, Laser and Particle Beams, vol. 11, No. 1, 1993, pp. 89-96.

Nuckolls, Fusion Scientists are Encouraged by Recent Experiments Demonstrating the Efficient Coupling of Laser Light to Targets and New Ideas for Economically Competitive Power Plants, The Feasibili of Inertial-Confinement Fusion, 1982, pp. 24-31.

Nuckolls, Future of Inertial Fusion Energy, Nature, vol. 412, Sep. 4, 2002, pp. 775-776.

Nuckolls, Inertial Confinement Fusion Targets, Lawrence Livermore Lab., Oct. 4, 1977, 6 pages.

Nuckolls, Laser Induced Implosion and Thermonuclear Burn, Jul. 23, 1973, 42 pages.

Nuckolls, Laser-induced Implosion and Thermonuclear Burn, Laser Interaction and Related Plasma Phenomena, 1974, pp. 399-425.

Nuckolls, Prospects for Laser Fusion, Lawrence Livermore Laboratory, May 13, 1974, 5 pages.

Nuckolls, Target Design, 1979, 330 pages.

Pape et al., Observation of a Reflected Shock in an Indirectly Driven Spherical Implosion at the National Ignition Facility, Physical Review Letters, Jun. 6, 2014, 5 pages.

Park et al., High-Adiabat High-Foot Inertial Confinement Fusion Implosion Experiments on the National Ignition Facility, Physical Review Letters, Feb. 7, 2014, 5 pages.

International Application No. PCT/US2017/014524, International Search Report and Written Opinion dated Oct. 4, 2017, 8 pages.

Peterson et al., Pressure Loadings on the Walls of a Light Ion Laboratory Microfusion Facility Target Chamber, Fusion Technology Institute University of Wisconsin-Madison WI 53706, vol. 608 (http://fti.neep.wisc.edu), Oct. 11, 1990, 9 pages.

Pollaine et al., National Ignition Facility Scale Hohlraum Asymmetry Studies by Thin Shell Radiography, Physics of Plasmas, vol. 8, Issue No. 5 http://dx.doi.org/10.1063/1.1364514, 2001, pp. 2357-2365.

Radha et al., Simulations and results from the National Ignition Facility, Physics of Plasmas, vol. 23 http://dx.doi.org/10.1063/1.4946023, 2016, 13 pages.

Raman et al., An In-Flight Radiography Platform to Measure Hydrodynamic Instability Growth in Inertial Confinement Fusion Capsules at the National Ignition Facility, Physics of Plasmas, vol. 21, http://dx.doi.org/10.1063/1.4890570, 2014, 21 pages.

Regan et al., Hot-Spot Mix in Ignition-Scale Inertial Confinement Fusion Targets, Physical Review Letters, Jul. 26, 2013, 5 pages.

Reinovsky et al., High Energy Density Physics Experiments with Compact Pulsed Power Drivers and Advanced Diagnostics (U), 2011, 22 pages.

Reintjes et al., Stimulated Raman and Brillouin Scattering, 2010, 59 pages.

Reis et al., The Big Science of Stockpile Stewardship, Physics Today, vol. 68, No. 8, Retrieved from Internet: http://dx.doi.org/10.1063/PT.3.3268, 2016, 9 pages.

Remington et al., Hydrodynamic Instabilities and Mix Studies on NIF: predictions, observations, and a path forward, Oct. 24, 2013, 7 pages.

Roberts et al., The Stability of Multiple-Shell ICF Targets, The Institute of Physics, vol. 13, 1980, pp. 1957-1969.

Robey et al., High Performance Capsule Implosions on the OMEGA Laser Facility with Rugby Hohlraums, Physics of Plasmas, vol. 17, 2010, pp. 1-11.

Robey et al., Hohlraum-Driven Mid-Z (SiO2) Double-Shell Implosions on the Omega Laser Facility and Their Scaling to NIF, Physical Review Letters, Oct. 2, 2009, pp. 1-4.

Robey et al., Precision Shock Tuning on the National Ignition Facility, Physics Review Letters, vol. 108, No. 21, 2012, 5 pages.

Rosen et al., The Indirect Drive Ignition Campaign on the National Ignition Facility (NIF), Jul. 18, 2013, 52 pages.

Rosocha et al., Excimer Lasers for Icf, Nuclear Fusion by Inertial Confinement: A Comprehensive Treatise, Chapter 15, 1993, pp. 371-420.

Roth et al., Fast Ignition by Intense Laser-Accelerated Proton Beams, Physical Review Letters, vol. 86, No. 3, Jan. 15, 2001, 4 pages.

Rygg et al., 2D X-Ray Radiography of Imploding Capsules at the National Ignition Facility, Physical Review Letters, May 16, 2014, 7 pages.

Rykovanov et al., Interaction of Intense Laser Pulses with Overdense Plasmas, Theoretical and Numerical Study, Nov. 2, 2009, 124 pages.

Schnittaman et al., Indirect-Drive Radiation Uniformity in Tetrahedral Hohlraums, Physics of Plasmas, vol. 3, No. 10http://dx.doi.org/10.1063/1.871511, 1996, 13 pages.

Scott et al., Numerical Modeling of the Sensitivity of X-Ray Driven Implosions to Low-Mode Flux Asymmetries, 2012, 5 pages.

Sethian et al., Target Physics Issues, Naval Research Laboratory, Jun. 20, 2000, 16 pages.

Shvydky, Two-Dimensional Numerical Evaluation of 1-D Multi-FM SSD Experiments on OMEGA EP, 2013, 12 pages.

Smalyuk et al., First Measurements of Hydrodynamic Instability Growth in Indirectly Driven Implosions at Ignition-Relevant Conditions on the National Ignition Facility, Physical Review Letters, May 9, 2014, 7 pages.

Smith, Reflectivity Variation of Target Surfaces, Innoven Proprietary Yellow Document, May 27, 2016, 15 pages.

(56) References Cited

OTHER PUBLICATIONS

Soures, Solid-state Lasers for Icf, Nuclear Fusion by Inertial Confinement: A Comprehensive Treatise, Chapter 14, 1993, pp. 351-370.
Stepanov et al., Energy Efficiency of Laser Greenhouse Target for Small Number of Irradiating Beams, Proceedings of SPIE, vol. 5228, 2003, pp. 233-243.
Takabe et al., Effect of Nonuniform Implosion on High-Gain Intertial Confinement Fusion Targets, Japanese Journal of Applied Physics, vol. 32, Part 1, No. 12A, 1993, pp. 5675-5680.
Temporal et al., Irradiation uniformity of directly driven inertial confinement fusion targets in the context of the shock-ignition scheme, Plasma Phys. Control. Fusion, vol. 53, 10 pages, 2011.
Temporal et al., Three-Dimensional Study of Radiation Symmetrization in Some Indirectly Driven Heavy Ion ICF Targets, Nuclear Fusion, vol. 32, No. 4, 1992, pp. 557-567.
Teubner et al., Absorption and Hot Electron Production by High Intensity Femtosecond Uv-Laser Pulses in Solid Targets, Physical Review E, vol. 54, No. 4, Oct. 1996, 11 pages.
Timmes X-2 et al., Spatial-Temporal Convergence Properties of the Tri-lab Verification Test Suite in 1d for Code Project A, 2006, 55 pages.
Tommasini et al., Tent-induced perturbations on areal density of implosions at the National Ignition, Physics of Plasmas, vol. 22, Issue. 5, 2015, 8 pages.
Town et al., Dynamic Symmetry of Indirectly Driven Inertial Confinement Fusion Capsules on the National Ignition Facilitya), Physics of Plasmas, vol. 21, 2014, 10 pages.
Uesaka et al., Parametric Survey of Microfireball Calcuilation for the Light Fusion Target Development Facility Design, Fusion Technology Institute, Aug. 1983, 62 pages.
Vandevender, Light-ion Accelerators for Icf, Nuclear Fusion by Inertial Confinement: A Comprehensive Treatise, Chapter 18, 1993, pp. 455-483.
Varnum et al., Progress toward Ignition with Noncryogenic Double-Shell Capsules, Physical Review Letters, vol. 84, No. 22, May 29, 2000, 3 pages.
Velarde et al., Nuclear Fusion by Inertial Confinement A Comprehensive Treatise, 1993, 759 pages.
Weilacher et al., The Effect of Laser Spot Shapes on Polar-Direct-Drive Implosions on the National Ignition Facility, Physics of Plasmas, vol. 22, 2015, 32 pages.
Welser et al., Development of Two Mix Model Postprocessors for the Investigation of Shell Mix in Indirect Drive Implosion Cores, Physics of Plasmas, vol. 14, 2007, 6 pages.
Winterberg, Mini Fission-Fusion-Fission Explosions (Mini-Nukes). A Third Way Towards the Controlled Release of Nuclear Energy by Fission and Fusion, z. Naturforsch, vol. 59a, 2004, pp. 325-336.
Yabe, The Compression Phase in Icf Targets, Nuclear Fusion by Inertial Confinement: A Comprehensive Treatise, Chapter 11, 1993, pp. 269-292.
Yabe et al., Theoretical and Computational Investigation on Implosion Process, Laser Interaction and Related Plasma Phenomena, 1984, pp. 857-868.
Yamanaka, Diagnostics of Laser-imploded Plasma, Nuclear Fusion by Inertial Confinement: A Comprehensive Treatise, Chapter 20, 1993, pp. 497-513.
Zinamon, Ion Beams-Target Interaction, Nuclear Fusion by Inertial Confinement: A Comprehensive Treatise, Chapter 5, 1993, pp. 119-150.
Zylstra et al., In-Flight Observations of Low-Mode $\rho R$ Asymmetries in NIF Implosionsa), Physics of Plasmas, vol. 22, 2015, pp. 056301-1-056301-9.

\* cited by examiner

SIMPLE AND ROBUST IMPLOSION OF ICF TARGETS

CROSS-REFERENCES TO RELATED APPLICATIONS

This application claims the benefit of U.S. Provisional Application No. 62/388,312 filed on Jan. 22, 2016, which is incorporated herein by reference.

BACKGROUND

Nuclear fusion by inertial confinement, Inertial Confinement Fusion ("ICF"), utilizes nuclear fusion reactions to produce energy. In most types of ICF systems, an external drive mechanism, such as a laser, delivers energy to a target containing nuclear fusion fuel. The target is designed to use this energy to compress, heat and ignite the fusion fuel within the target. If a sufficient amount of fuel is compressed sufficiently and heated sufficiently, a self-sustaining fusion reaction can occur in which energy produced by fusion reactions continues to heat the fuel. This is generally referred to as "ignition." The inertia of the compressed fuel can keep it from expanding long enough for significant energy to be produced before expansion of the fuel and the resultant cooling terminates the fusion reaction. Most conventional ICF target designs involve a spherical target which is imploded symmetrically from all directions, relying on the stagnation of the inwardly-accelerated fuel at the center of the sphere to produce the required densities and temperatures.

Production of the very high temperatures and densities required for fusion ignition may require a substantial amount of energy. The exact amount of energy required depends on the specific target design in use. In order to be useful for energy generation, the target must be capable of producing more energy from fusion reactions than was required to ignite it. In addition, the amount of energy required by the target must be physically and/or economically realizable by the drive mechanism being used.

For this reason, conventional ICF target designs have focused on achieving the required temperatures and densities as efficiently as possible. These designs are often complex in their construction and operation. They are also sensitive to imperfections in the target's manufacturing, as well as any non-uniformity in the delivery of energy to the target from the drive mechanism. Imperfection and non-uniformity can lead to asymmetry in the target's implosion, which may potentially reduce the densities and temperatures achieved below the threshold required for ignition. Furthermore, successful operation of these complex designs often requires achieving a precise balance between multiple competing physical processes, many of which are poorly understood and difficult to model. When actually constructed and deployed, these complex ICF target designs often fail to perform as their designers intended, and to date none have actually succeeded in producing ignition or the desired fuel conditions.

The National Ignition Facility ("NIF") target exemplifies the conventional approach. The NIF target involves an outer ablator shell comprising primarily plastic or beryllium with varius dopants surrounding a shell of cryogenic D-T ice with a central void filled with low-density D-T gas. The NIF target is placed in a cylindrical hohlraum. In operation, a laser having of 192 separate beamlines, with a total energy delivered to the hohlraum of up to 1.8 MJ, illuminates a number of spots on the inner surface of the hohlraum, producing a radiation field which fills the hohlraum. The radiation field ablates the ablator layer, and the reactive force of the ablation implodes the target. The laser pulse is 18 nanoseconds long and is temporally tailored in order to drive a series of precisely-adjusted shocks into the target. The timing and energy level of these shocks are adjusted in order to achieve a quasi-isentropic, efficient implosion and compression of the shell of D-T fuel. Stagnation of these shocks and inward-moving material at the center of the target is intended to result in the formation of a small "hotspot" of fuel, at a temperature of roughly 10 keV and a pr of approximately 0.3 grams/cm$^2$, surrounded by a much larger mass of relatively cold D-T fuel. It is intended that the fuel in the "hotspot" will ignite with a fusion burn propagating into the cold outer shell.

At the time of this disclosure, the NIF target has failed to ignite, achieving peak temperatures and densities of about 3 keV and a pr of approximately 0.1 grams/cm$^2$ in the hotspot, which is well short of the 10 keV and 0.3 grams/cm$^2$ that is believed to be required for ignition. There is no clear consensus on what has caused the failure of the NIF target to achieve ignition, but it appears that this failure may be partially due to low-order asymmetry in the hotspot formation and lower than expected implosion velocities.

BRIEF SUMMARY

ICF targets and techniques for their utilization are disclosed which may be simpler and more robust than conventional targets. In some embodiments, these targets may operate at large pr and/or may be imploded primarily by a single strong shock. In some embodiments, the entire volume of fuel may be heated to the temperatures required for ignition at once, such that all the fuel mass participates in the physical processes involved in ignition. Targets of this type may be less sensitive to drive non-uniformity and to the temporal profile of driver energy delivery than conventional ICF targets. In some embodiments, the computational requirements for design and analysis of these targets' operation may be substantially reduced compared to conventional targets.

In some embodiments, a target assembly for Inertial Confinement Fusion ("ICF") may include a cylindrical hohlraum; and a target disposed within the hohlraum. The target may include an ablator layer, a shell disposed within the ablator layer, and a fuel region disposed within the shell. The hohlraum may include an opening in at least one end of the cylinder, and the target assembly may further include a circular end cap that covers a center portion of the opening while leaving a ring between the circular end cap and the end of the cylinder through which laser beams can enter the hohlraum. The circular end cap may be held in place by at least two standoffs. The hohlraum may be made from tungsten. The target assembly my further include one or more ring-shaped baffles disposed along an inner wall of the hohlraum. The one or more ring-shaped baffles may include a center baffle located at a center of the hohlraum, a first baffle located to one side of the center baffle along a long axis of the hohlraum, and a second baffle located to another side of the center baffle along the long axis of the hohlraum. The ablator layer may be made from beryllium. The shell may include a spherical tungsten shell having a thickness of approximately 0.005 cm. The fuel region may include a sphere of deuterium-tritium gas having a radius of approximately 0.25 cm. The target assembly may further include a low-Z foam filler disposed within the hohlraum that holds the target in an approximate center of the hohlraum.

In some embodiments, A method of imploding an Inertial Confinement Fusion (ICF) target may include directing laser energy into a hohlraum, where a target is disposed within the hohlraum that includes an ablator layer, a shell disposed within the ablator layer, and a fuel region disposed within the shell. The method may also include ablating the ablator layer in response to the laser energy being directed into the hohlraum, and generating a single shockwave that is driven inward through the ablator layer. The method may further include impulsively accelerating the shell inward when hit by the single shockwave, and compressing the fuel region by the inward acceleration of the shell. The laser energy may include a square pulse. The method may also include suppressing fluctuations and non-uniformities in a density and pressure profile within the fuel region. The fluctuations and non-uniformities may be suppressed by interaction with a radiation field in the fuel region. The method may additionally include converting the laser energy into x-ray radiation within the hohlraum. The laser energy may produce an illumination pattern on one or more ring-shaped baffles lining the hohlraum such that the one or more ring-shaped baffles absorb the laser energy and radiate a uniform field of x-ray radiation that fills the hohlraum. Compressing the fuel region may include uniformly raising the temperature of the fuel region without generating a hot spot. The method may further include reducing radiation losses from the fuel region using the shell after the fuel region is compressed. Compressing the fuel region may include generating a pr of at least approximately 0.6 g/cm$^2$ and a temperature of at least approximately 2.5 keV in the fuel region. The single shockwave that is driven inward through the ablator layer may be uniform.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
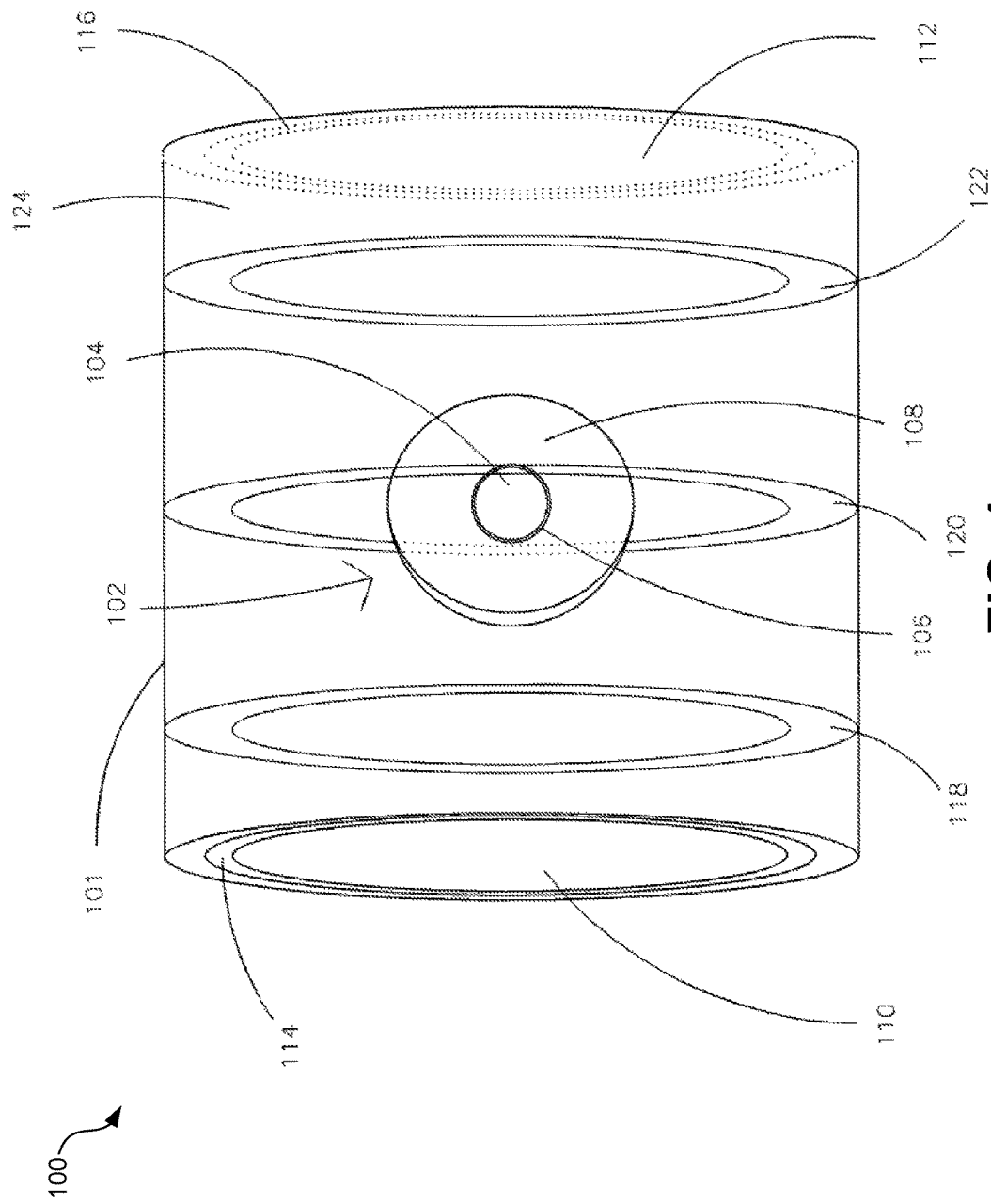
FIG. 1 illustrates a cross-section comprising a cylindrical open ended hohlraum and a centrally-located target, according to some embodiments.

The term "Z" may refer to the atomic number of an element, i.e. the number of protons in the nucleus. The term "A" may refer to the atomic mass number of an element, i.e. the number of protons and neutrons in the nucleus.

The term "approximately" includes a given value plus/minus 15%. For example, the phrase "approximately 10 units" is intended to encompass a range of 8.5 units to 11.5 units.

The term "isentropic drive mechanism" may refer to a drive mechanism that is designed or utilized to compress material (such as fusion fuel) in an isentropic manner. "Isentropic" means compressing material while minimizing the total entropy increase (heating) of the material. Isentropic compression is therefore the most efficient way to compress material. When imploding a sphere or shell of material, such as an ICF target, isentropic compression requires that the drive mechanism deliver pressure to the material in a specific way over the entire duration of the compression, utilizing a low pressure initially that is increased over the course of the compression according to a mathematical formula. This can be difficult to achieve, and complicates the design of both the target drive mechanism and the driver that delivers energy to the drive mechanism (such as a laser or heavy ion beam).

The term "quasi-isentropic drive mechanism" may refer to a drive mechanism that approximates an ideal, perfectly-isentropic compression using a means other than a ramped pressure profile. For instance, drive mechanisms that compress material by producing a series of shocks of increasing strength may approach the efficiency of a perfectly-isentropic compression. While in some circumstances that are simpler than perfectly isentropic versions, these drive mechanisms are still complex to engineer.

The term "impulsive drive mechanism" may refer to a drive mechanism that compresses material impulsively, typically by the production of a single shock wave that accelerates the material and causes it to move inward. The pressure produced by an impulsive drive mechanism is typically highest at the beginning of the implosion, and decreases afterward. Impulsive drive mechanisms are limited in the amount of compression they can produce and in the efficiency of compression achieved. They may be simpler to design and use than other drive mechanisms. For instance, an impulsive drive mechanism may not require that the driver (laser, heavy ion beam, etc.) be active during the entire course of the implosion, but may instead deliver its energy over a shorter timescale, potentially short comparable to the timescale of hydrodynamic motion in the target.

The term "shock" may refer to sharp discontinuities in the flow of material. These discontinuities can be induced in any hydrodynamic variables such as temperature, pressure, density, velocity, etc.

The term "shock convergence" may refer to the convergence of a shock which may travel from an outer shell and to an inner shell. It is calculated as the ratio of the outer radius of an inner shell, $R_c$, and the inner radius of an outer shell $R_o$. That is, $$SC = \frac{R_o}{R_c}.$$

For instance, given a first shell with an inner radius of 10 cm, and a second shell disposed within the first shell with a inner radius of 0.5 cm, the shock convergence is 20. Any other combination of inner and outer radiuses can be used.

The term "atom" may refer to a particle of matter, composed of a nucleus of tightly-bound protons and neutrons with an electron shell. Each element has a specific number of protons.

The term "neutron" may refer to a subatomic particle with no electrical charge. Their lack of a charge means that free neutrons generally have a greater free range in matter than other particles. The term "proton" may refer to a subatomic particle with a positive electrical charge. The term "electron" may refer to a subatomic particle with a negative electrical charge, exactly opposite to that of a proton and having less mass than a proton and a neutron. Atoms under ordinary conditions have the same number of electrons as protons, so that their charges cancel.

The term "isotope" may refer to atoms of the same element that have the same number of protons, but a different number of neutrons. Isotopes of an element are generally identical chemically, but may have different probabilities of undergoing nuclear reactions. The term "ion" may refer to a charged particle, such as a proton or a free nucleus.

The term "plasma" may refer to the so-called fourth state of matter, beyond solid, liquid, and gas. Matter is typically in a plasma state when the material has been heated enough to separate electrons from their atomic nuclei.

The term "Bremsstrahlung radiation" may refer to radiation produced by interactions between electrons and ions in a plasma. One of the many processes that can cool a plasma is energy loss due to Bremsstrahlung radiation.

The product "pr" may refer to the areal mass density of a material. This term may refer to a parameter that can be used to characterize fusion burn. This product is expressed in grams per centimeter squared, unless otherwise specified.

The term "runaway burn" may refer to a fusion reaction that heats itself and reaches a very high temperature. Because the D-T reaction rate increases with temperature, peaking at 67 keV, a D-T plasma heated to ignition temperature may rapidly self-heat and reach extremely high temperatures, approximately 100 keV, or higher.

The term "burn fraction" may refer to the percentage of fusion fuel consumed during a given reaction. The greater the burn fraction, the higher the energy output.

The term "convergence" may refer to how much a shell (or material) has been compressed radially during implosion. For instance, a shell that starts with a radius of 0.1 cm, R, and is compressed to a radius of 0.01 cm, $R_c$, during implosion has a convergence of 10. That is, $$C = \frac{R}{R_c}.$$

Nuclear fusion may refer to a type of reaction that occurs when certain atomic nuclei collide. In most of these reactions, two light nuclei combine, producing heavier nuclei and/or nuclear particles. In the process, some of the energy in the nuclear bonds holding the nuclei together is released, usually settling in the form of thermal energy (heat) in the material surrounding the reacting particles. These reactions only occur between atomic nuclei that are very energetic, such as those that have been heated to a high temperature to form a plasma. The specific temperatures vary between reactions. The reaction between deuterium and tritium, two hydrogen isotopes, is generally considered to require the lowest temperature for ignition. As other fusion reactions require higher temperatures, most nuclear fusion power concepts envision the use of D-T fuel.

Two challenges in using nuclear fusion to produce power are referred to as ignition and confinement. Achieving ignition requires heating a plasma of fusion fuel until it becomes hot enough to heat itself, meaning the energy released from fusion reactions exceeds the energy lost through various processes, such as Bremsstrahlung radiation and hydrodynamic expansion. The temperature at which this occurs is known as the "ignition temperature," which for D-T fuel can range from 2-10 keV, depending on the physical properties of the plasma. After ignition, self-heating in the fuel can cause it to reach temperatures of 100 keV or more.

Once fuel has been ignited, confinement may refer to the challenge of keeping the fuel from expanding (thus cooling and ceasing to burn) long enough for it to produce the desired amount of energy: at least as much energy as was required to ignite the fuel and keep it confined—and hopefully significantly more. While heating the fuel to ignition is simply a matter of delivering energy to it, confinement is more challenging. There is no known way to confine a plasma heated to ignition temperature or beyond with a simple mechanical system. Any solid substance, such as the metal wall of a container, that comes into contact with a fusion plasma would either become instantly vaporized, would drastically cool the plasma and stop the burn itself, or both.

One method of confinement uses a magnetic field to keep the fuel from expanding. This is referred to as Magnetic Confinement Fusion (MCF). Magnetic confinement has many inherent difficulties and disadvantages, and economical power generation from an MCF facility appears decades away.

Another approach takes advantage of how the characteristics of fusion burn change with fuel amount and density. At ordinary densities and practicable amounts, a D-T plasma heated to ignition temperature will disassemble (expand and stop burning) before producing anywhere near the energy required to originally heat it. However, as the density of a given amount of fuel is increased, the rate at which the fuel will burn increases faster than the rate at which it will expand. This means that, if the fuel can be compressed sufficiently before heating it, the fuel's own resistance to motion (inertia) will keep it from expanding long enough to yield a significant amount of energy. This approach is referred to as Inertial Confinement Fusion (ICF).

At the pressures and temperatures involved in imploding and burning ICF targets, specific material properties that one observes in everyday life (hardness, strength, room temperature thermal conductivity, etc.) may be irrelevant, and the hydrodynamic behavior of a material can depend most strongly on the material's average atomic number, atomic mass number, and solid density. As such, in discussing material requirements in ICF targets, it is convenient to discuss classes of material. For the purposes of the following discussion, the term "low-Z" will refer to materials with an atomic number of 1-5 (hydrogen to boron); the term "medium-Z" will refer to materials with an atomic number of 6-47 (carbon to silver); and the term "high-Z" will refer to materials with an atomic number greater than 48 (cadmium and above). Unless otherwise stated, the use of these terms to describe a class of material for a specific function is intended only to suggest that this class of material may be particularly advantageous for that function, and not (for instance) that a "high-Z" material could not be substituted where a "medium-Z" material is suggested, or vice-versa.

Specific material choice may be important, where indicated, as different isotopes of the same element may undergo completely different nuclear reactions, and different elements may have different radiation opacities for specific frequencies. The differing solid densities of materials with similar-Z may also important for certain design criteria in some embodiments.

FIG. 1, illustrates a target assembly 100. Target assembly 100 comprises a cylindrical hohlraum 101, made of tungsten, with an inner radius of approximately 0.7228 cm, a thickness of approximately 0.1 cm, and a length of approximately 1.4456 cm. The ends of hohlraum 101 may be closed by circular end plates 110 and 112, also made of tungsten, with approximately the same thickness. End plates 110 and 112 may be solid with the exception of beam entrance holes 114 and 116, which may be circular holes manufactured through the entire thickness of end plates 110 and 112. Beam entrance holes 114 and 116 may have an inner radius of approximately 0.57 cm and outer radius of approximately 0.69 cm, measured from the center of end plates 110 and 112. The volume enclosed by hohlraum 101 and end plates 110 and 112 may be referred to as hohlraum cavity 124. Three ring-shaped baffles may be located along the inner wall of hohlraum 101, protruding approximately 0.1028 cm into hohlraum cavity 124. These may include left baffle 118, center baffle 120, and right baffle 122. Center baffle 120 may be located at the center of hohlraum 101, and left baffle 118 and right baffle 122 may be located approximately 0.59 cm from center baffle 120 along the long axis of hohlraum 101.

Figure 2:
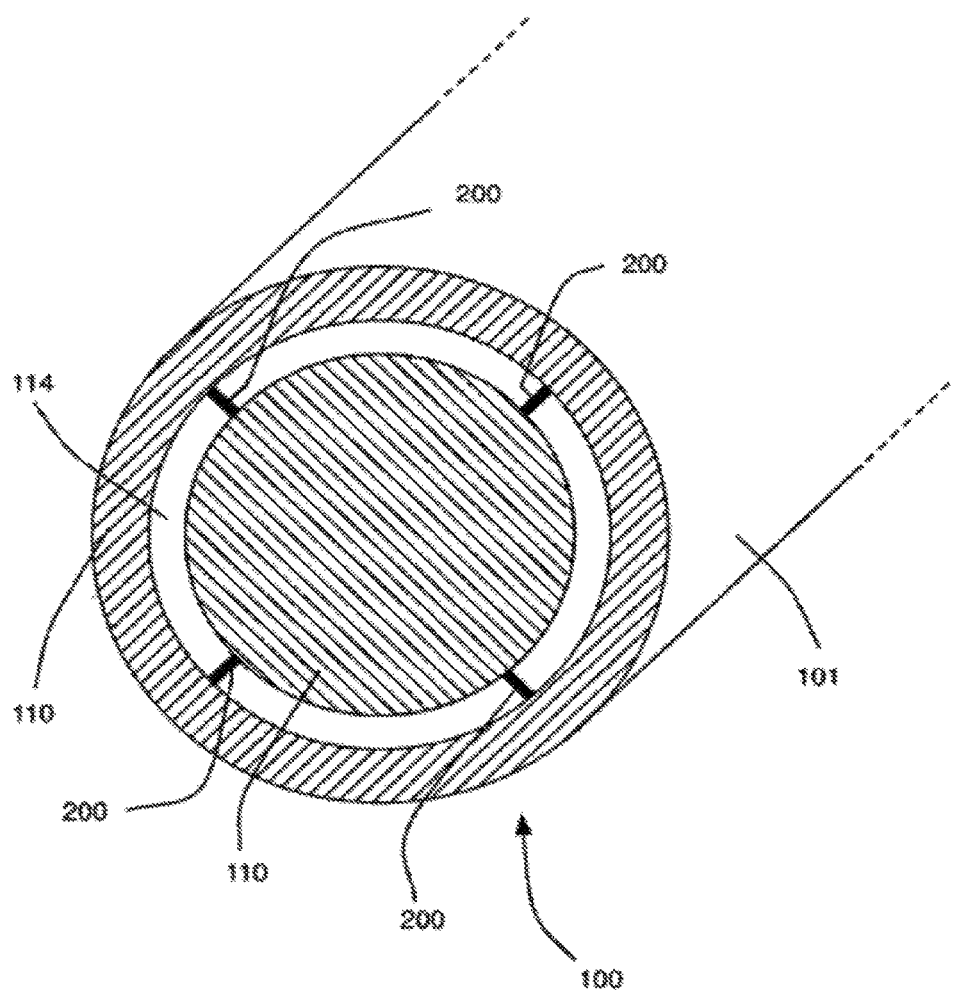
FIG. 2 illustrates a depiction of one end of a hohlraum, according to some embodiments.

FIG. 2 illustrates a view of one end of target assembly 100, illustrating how the center of end plate 110 can be supported by four plastic standoffs 200 spanning beam entrance hole 114. Plastic standoffs 200 may be sized so as to minimize their cross-sectional area within beam entrance hole 114. The number of plastic standoffs 200 may be four in some embodiments, and their number may be more or less than four in other embodiments. Alternatively, other means may be used to support the center of end plate 110, such as fibers, filaments, films or sheets, as long as these do not substantially interfere with beam propagation through entrance hole 114. While not pictured, the same configuration can be used and the same considerations can apply for end plate 112 and beam entrance hole 116 on the opposite side of hohlraum 101.

Returning to FIG. 1, in the center of hohlraum 101 may be fuel capsule 102. Fuel capsule 102 may be a sphere comprising a central region of D-T fuel 104, with a radius of approximately 0.0755 cm and density of approximately 0.22 g/cc. Surrounding D-T fuel 104 may be tungsten shell 106, which may be a spherical shell with a thickness of approximately 0.0052 cm. Surrounding tungsten shell 106 may be beryllium ablator 108, a spherical shell with a thickness of approximately 0.1713 cm. The total radius of fuel capsule 102 in this embodiment is thus approximately 0.252 cm, giving a total size (diameter) of approximately 0.504 cm for fuel capsule 102. Fuel capsule 102 may be suspended in the center of hohlraum 101 by various means commonly used including stalks, fibers, membranes, filaments, supports or threads. Alternatively, hohlraum cavity 124 can be filled with low-density, low-Z foam to support fuel capsule 102 and/or end plates 110 and 112. Note that fuel capsule 102 may also be referred to as the "target", while target assembly 100 refers to the combined assembly of hohlraum 101 and fuel capsule/target 102.

Target assembly 100 may be imploded in the following manner. Target assembly 100 may be placed in an ICF reaction chamber, configured to contain the energy that will be released by the target. Two or more beamlines of an ICF laser may be aligned with the ends of hohlraum 101, such that laser beams can enter hohlraum cavity 124 through beam entrance holes 114 and 116. The laser may be configured to produce an illumination pattern on the three baffles lining hohlraum 101 (left baffle 118, center baffle 120, and right baffle 122). The laser pulse can be, for example, 8 nanoseconds in duration, with constant power. The total energy delivered to center baffle 120 can be approximately 4.74 MJ, with approximately 13.16 MJ delivered to the left baffle 118 and approximately 13.16 MJ delivered to right baffle 122.

The absorption and re-radiation of the laser energy on the three baffles 118, 120 and 122 may result in the formation of a field of x-ray radiation filling hohlraum cavity 124, and such radiation may reach a temperature of up to approximately 350 eV in some embodiments. This radiation field may ablate the outer layers of beryllium ablator 108, initiating the implosion of fuel capsule 102 by driving a shock symmetrically inwards through ablator 108. The choice of illumination geometry and energy allocation between the baffles is intended to produce a high degree of uniformity in the radiation flux incident on fuel capsule 102 and thus a high degree of uniformity in the shock that is launched, while also maximizing the coupling of energy to fuel capsule 102. In some embodiments, the total energy absorbed by fuel capsule 102 may be approximately 7.3 MJ.

When the shock driven through ablator 108 reaches shell 106, the shell may be accelerated inwardly and may reach a peak inward velocity of approximately $2.9 \times 10^7$ cm/s. The inward acceleration of shell 106 may drive a shock into fuel 104. The inward motion of shell 106 and the convergence of the shock that shell 106 launches may result in compression and heating of fuel 104. The peak areal density reached in the fuel may be approximately 0.75 grams per $cm^2$. Because of this relatively high areal density, the dominant energy loss mechanism of the fuel may be radiation emission. The high radiation opacity of shell 106 may lower the radiative energy loss of fuel 104 by reflecting a substantial fraction of radiated energy back into fuel 104. Because of this, the ignition of fuel 104 may occur at a relatively low temperature of approximately 2.5-3 keV. Once ignited, the temperature of fuel 104 may rise further due to self-heating effects, and fusion reactions in fuel 104 may produce a substantial amount of energy, e.g. approximately 50 MJ.

The implosion process described above may have numerous advantages relative to the process utilized by conventional ICF targets, such as a NIF-style target. The implosion is simple and robust and insensitive to many effects to which the NIF target is highly sensitive. In some embodiments, fuel capsule 102 may be imploded by a single shock and a square 7.68 nanosecond pulse and is not sensitive to details of the pulse shape; almost any pulse shape that delivers approximately 31.05 MJ within 8 nanoseconds can be used. As such, there is no need to design or optimize the power or timing of a series of multiple shocks, as are required by the NIF target, and precise knowledge of the radiation opacities of ablator 108 is not required. Additionally, the target is insensitive to the effects of any hot electrons generated by laser absorption in the hohlraum cavity 124, and the laser beams do not cross inside hohlraum 101.

Furthermore, the implosion process exemplified by this embodiment may be more robust against hydrodynamic instability growth and drive non-uniformity than that of a conventional ICF target. Shell 106 in this embodiment may be subjected to a more impulsive acceleration than the shell in the NIF target, being accelerated primarily by a single converging shock. This impulsive acceleration results in more Richtmeyer-Meshkov (RM) instability growth than Rayleigh-Taylor (RT) instability growth. RM growth may in general be less severe than RT growth. Also, the implosion symmetry properties of a converging shock may be superior to those of an accelerated shell of material over the same convergence. Finally, the material convergence of the shell may be approximately 7.3, which may be substantially lower than the material convergence of a NIF-style target, and this may also result in substantially less instability growth.

The ignition process of this embodiment also has numerous advantages relative to that utilized by conventional ICF targets. Because of the large fuel mass and the high-Z shell 106 surrounding fuel 104, the ignition temperature of the fuel 104 may be approximately 2.5-3 keV, as opposed to the approximately 10 keV required for ignition of a NIF-style target. Furthermore, because of the relatively low ignition temperature and high areal density pr, interaction with the radiation field in the DT gas may strongly damp acoustic perturbations of wavelengths comparable to the fuel dimensions, and the ignition process may be more isothermal as compared to NIF or conventional targets. Finally, ignition may occur before stagnation of the inner surface of inner shell 104 in some embodiments, which may lower the growth factors for hydrodynamic instability at the time of ignition compared to conventional targets. For these reasons, the ignition process may be much more stable against perturbations. This, along with the simplicity and robustness of the single-shock implosion process with low material convergence, provides for high confidence in successful target operation. These characteristics of the target implosion and ignition process may also greatly simplify the process of designing and analyzing the behavior of a given target using analytical techniques or numerical simulations. In some embodiments, some of these advantages may become significant at areal densities (pr) of approximately 0.6 grams per square centimeter or greater.

Numerous variations of this embodiment are possible. The target assembly 100 and/or fuel capsule 102 may be scaled up or down in size. The density of fuel 104 may be increased or decreased. Gaseous D-T, liquid D-T, or solid D-T may be used. Alternative fuels may be used as well, such as pure deuterium fuel, or D-T with a reduced fraction of tritium. The radius of fuel 104 may be increased or decreased. Shell 106 may be made of materials other than tungsten. Use of high-Z materials, or materials with a high opacity to radiation in the approximately 0.5-2.5 keV range, may be advantageous, but other materials may be substituted as well. The thickness of shell 106 may be increased or decreased.

A decrease in the density of fuel 104 may increase the temperatures achieved during implosion of fuel 104, but may also decrease the peak pr achieved and increase the temperature required for ignition. An increase in radius of fuel 104 while maintaining a fixed density may improve pr, while decreasing peak temperature achieved during implosion or requiring more drive energy to achieve the same temperature. Reducing the thickness of shell 106 may lead to higher implosion velocities in some embodiments, but may make shell 106 more susceptible to disruption from hydrodynamic instabilities.

Ablator 108 may be manufactured from other materials or combinations of materials. Low-Z materials may be advantageous as ablators. Ablator 108 may be doped with certain materials in order to achieve favorable ablation characteristics and close "holes" in the radiation opacity. The thickness of ablator 108 may be increased or decreased. The thickness of ablator 108 may affect the pressure of the converging shock when it arrives at shell 106, the gain of the target, the sensitivity of the target to implosion asymmetry, and potentially other properties. Ablator 108 may also comprise multiple layers of different materials. The use of a radiation hydrodynamics code may be advantageous in optimizing the design of fuel capsule 102, including the composition and dimensional relations of the components discussed.

Generally, some embodiments invention may be increased in size by hydrodynamically equivalent scaling in which all linear dimensions of the fuel capsule 102 and/or target assembly are multiplied by the same factor. This may increase the pr achieved in fuel 104 during implosion, which may have the effect of lowering the temperature required for ignition of fuel 104, increasing radiation damping of perturbations in fuel 104, and generally leading to a more robust implosion and ignition process, at the expense of requiring greater energy to drive the target.

Some embodiments may be reduced in size by the same process. However, as any given embodiment is reduced in size, the pr achieved in fuel 104 during implosion may decrease. As pr decreases, the mechanism of operation of the embodiment may gradually change, and below a certain threshold, some or all of the advantages described above may be lost and ignition may not occur. For example, as pr decreases, the temperature required to achieve ignition in fuel 104 may increase. Radiation damping of perturbations in fuel 104 may decrease and electron thermal conduction, as opposed to radiation transport, may become the dominant mechanism of energy loss from fuel 104. Thus, the target may move away from the equilibrium ignition regime, and ignition of fuel 104 may become more dependent on the details of hydrodynamic motion and temperature profiles achieved in fuel 104, and may become more sensitive to perturbations introduced into fuel 104 by non-uniformity in the target's manufacturing or drive mechanism. At some point as the size of the embodiment is reduced, the implosion velocity and/or uniformity of implosion may be insufficient to achieve ignition of fuel 104, given the reduced pr. The exact point at which this transition occurs may vary between embodiments but in general, the minimum pr for successful operation may be characterized as an areal density of approximately 0.6 g/cm$^2$ in the entire fuel 104, evaluated at the time of stagnation of the inner surface of tungsten shell 106. The minimum size for embodiments of this invention may be bounded by the size necessary to achieve this pr while still being imploded by an impulsive drive mechanism and a single strong shock.

Figure 3A:
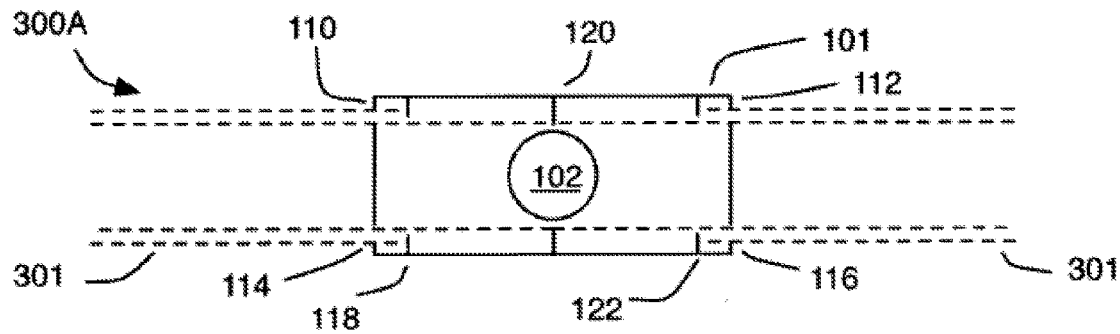
FIG. 3A illustrates a first hohlraum configuration that may be used for implosion and ignition of targets, according to some embodiments.

Hohlraum 101 may take on multiple variations as well. FIGS. 3A-3E illustrate multiple possible hohlraum geometries and beam illumination patterns. Configuration 300A in FIG. 3A illustrates a configuration described above, comprising a cylindrical hohlraum 101, with ring-shaped holes 114 and 116 in end plates 110 and 112, and laser beams 301 illuminating three ring-shaped baffles 118, 120, and 122 on the interior surface of hohlraum 101. In this configuration, the laser beams may have a long focal length and may be essentially parallel with hohlraum 101. This illumination pattern could be produced by two laser beamlines that are coaxial with hohlraum 101, each directly illuminating the baffles through holes 114 and 116.

Figure 3B:
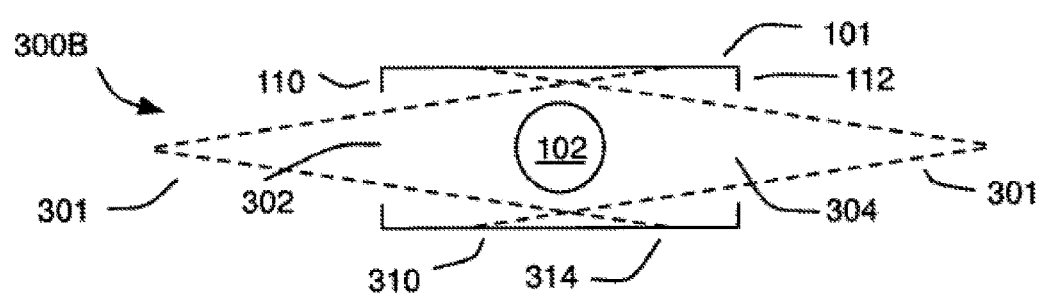
FIG. 3B illustrates a second hohlraum configuration that may be used for implosion and ignition of targets, according to some embodiments.

Configuration 300B in FIG. 3B shows another configuration, in which beam entrance holes 302 and 304 may be circular openings instead of rings, and the illumination pattern on hohlraum 101 may include two rings 310 and 314 formed by direct illumination of the walls of hohlraum 101. This illumination pattern may be produced by a laser with a short focal length, or with multiple beamlines arranged at shallow angles around the long axis of hohlraum 101, each projecting a portion of the rings 310 and 314.

Figure 3C:
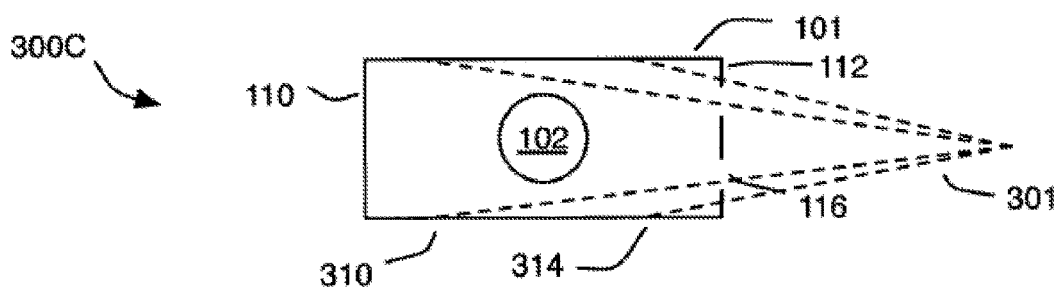
FIG. 3C illustrates a third hohlraum configuration that may be used for implosion and ignition of targets, according to some embodiments.
Figure 3D:
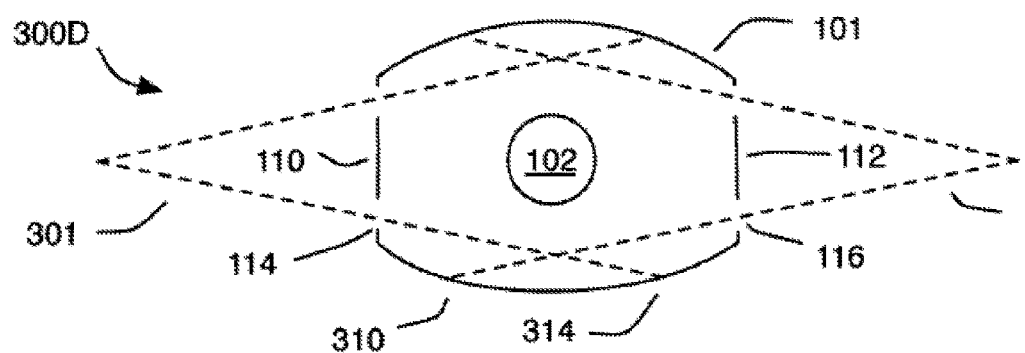
FIG. 3D illustrates a fourth hohlraum configuration that may be used for implosion and ignition of targets, according to some embodiments.
Figure 3E:
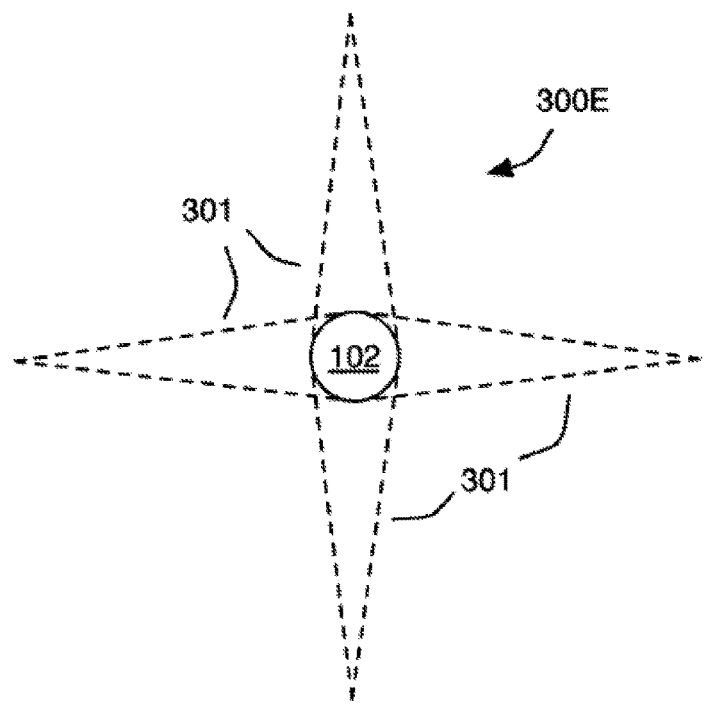
FIG. 3E illustrates a fifth hohlraum configuration that may be used for implosion and ignition of targets, according to some embodiments.

Configuration 300C in FIG. 3C illustrates a third configuration, in which left end plate 110 may be solid, and there may be just a single ring-shaped entrance hole 116 in right end plate 112. Once again, the illumination pattern may include two rings 310 and 314, which may be formed by various optical layouts. Configuration 300D in FIG. 3D illustrates a configuration with a curved hohlraum 101, two ring-shaped entrance holes 114 and 116, and two rings 310 and 314. Configuration 300E in FIG. 3E illustrates a direct-drive configuration, in which laser beams 301 may directly illuminate the surface of fuel capsule 102.

Many other configurations are possible. For example, the illumination pattern can take the form of a series of spots instead of rings. The positioning of the rings, the number of rings, and the allocation of laser energy between the rings and/or spots may be adjusted so as to achieve sufficient uniformity in the radiation field driving fuel capsule 102. The end plates 110 and 112 may be curved, and their radius of curvature may be the same as or different from that of the hohlraum wall 101. In general, it may be desirable to reduce the size of beam entrance holes (e.g. entrance holes 114, 116, 302, 304) to the minimum size required to permit entrance of laser beams 301, so as to reduce losses due to radiation escaping the hohlraum cavity through the entrance holes. Hohlraum 101 and end plates 110, 112 may be manufactured from a single material or a combination of materials. A high-Z material such as tungsten, gold or depleted uranium may be advantageous in reducing radiation losses into the hohlraum walls. The material used for end plates 110 and 112 may be different from or the same as that used to construct hohlraum 101. Hohlraum 101 may comprise different materials at different positions. The choice of material and positioning of different materials may be adjusted so as to optimize the uniformity of radiation driving fuel capsule 102. If present, the material used for baffles 118, 120 and 122 may be the same as or different from that of hohlraum 101.

In some embodiments, the designer may choose a combination of dimensions, materials, densities, and laser parameters that does not lead to the conditions required for ignition being reached in fuel 104 in operation. Such targets may be advantageous for experimental purposes, for validation of computational design codes, for testing of diagnostic and monitoring equipment, or for use in ICF target chambers that may have limited ability to contain the output of fusion reactions.

Figure 4:
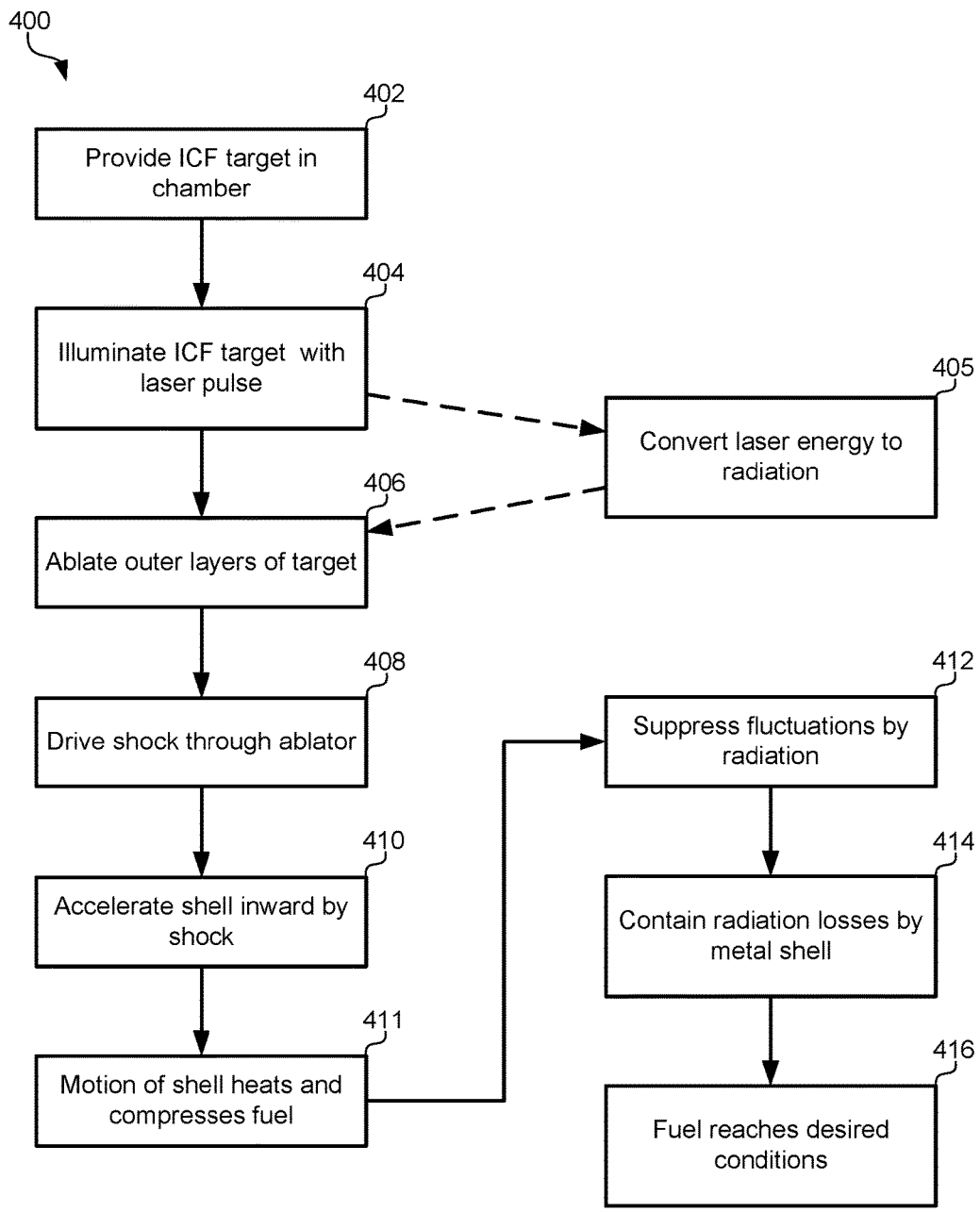
FIG. 4 shows a flowchart illustrating a process for imploding and igniting an ICF target, according to some embodiments.

FIG. 4 illustrates a flowchart 400 of a method for imploding a target, according to some embodiments. In step 402, a target assembly as described above, comprising at least an ablator, shell, and fuel region, optionally enclosed by a hohlraum, may be positioned in a suitable ICF reaction chamber. In step 404, the target and/or hohlraum may be illuminated with a laser pulse. Optionally, in step 405, the laser energy can be converted to x-ray radiation within the hohlraum to drive the target and potentially increase the uniformity of the target implosion. This step can be omitted if the target is driven directly by the laser beams.

In step 406, the outer layers of the target may be ablated either directly by the laser energy, or indirectly by the radiation produced in step 405. In step 408, a single shock wave may be driven inwardly through the ablator region by the ablation process initiated in step 406. In step 410, the shockwave generated in step 408 may hit the shell and impulsively accelerate it inwardly. In step 411, the inward motion of the shell initiated in step 410 may heat and compress the fuel. In step 412, fluctuations and non-uniformities in the density and pressure profiles within the fuel may be damped by interaction with the radiation field in the fuel. As a result, the entire volume of the fuel may be heated nearly uniformly and the fuel may remain nearly isothermal. In step 414, the shell may act to contain and reduce radiation losses from the fuel. In step 416, the fuel may reach the desired conditions, with this step occurring earlier than it otherwise would due to the suppression of radiation losses in step 414. In some embodiments, this may include the conditions required for ignition, which may include a pr of at least approximately 0.6 g/cm$^2$ and a temperature of at least approximately 2.5 keV. The exact conditions required for ignition at this step may vary between embodiments and utilizations of this process. The desired conditions may also represent conditions of density and temperature below the threshold for ignition, e.g. for experimental or validation purposes as discussed above.

As discussed above, this implosion process may be more robust and less sensitive to drive nonuniformity and implosion asymmetry than other methods of igniting an ICF target. Steps in the process described above are presented in a specific order for clarity but in practice certain steps may overlap in time or may occur simultaneously. Additionally, the embodiments discussed in this application are intended to be exemplary only, and not an exhaustive list of all possible variants of the invention. Certain features discussed as part of separate embodiments may be combined into a single embodiment. Additionally, embodiments may make use of various features known in the art but not specified explicitly in this application.

Embodiments can be scaled-up and/or scaled-down in size, and relative proportions of components within embodiments can be changed as well. The range of values of any parameter (e.g. size, thickness, density, mass, etc.) of any component should not be construed as a limit on the maximum or minimum value of that parameter unless specifically described as such.

What is claimed is:

1. A target assembly for Inertial Confinement Fusion ("ICF"), the target assembly comprising:
   a cylindrical hohlraum comprising
     an opening in at least one end of the cylindrical hohlraum;
     a disc end cap that covers a center portion of the opening while leaving an annular-shaped opening between the disc end cap and the at least one end of the cylindrical hohlraum through which laser beams can enter the hohlraum; and
     one or more ring-shaped baffles disposed on an interior surface of the cylindrical hohlraum that are positioned to be illuminated by the laser beams entering the hohlraum through the annular-shaped opening; and
   a target supported by a foam metal material and disposed within the hohlraum, wherein the target comprises:
     an ablator layer, wherein the ablator layer comprises a combination of low-Z, medium-Z, and high-Z materials;
     a shell disposed within the ablator layer; and
     a fuel region disposed within the shell.

2. The target assembly of claim 1, wherein the circular end cap is held in place by at least two standoffs.

3. The target assembly of claim 1, wherein the hohlraum is comprised of tungsten.

4. The target assembly of claim 1, wherein the one or more ring-shaped baffles comprises:
- a center baffle located at a center of the hohlraum;
- a first baffle located to one side of the center baffle along a long axis of the hohlraum; and
- a second baffle located to another side of the center baffle along the long axis of the hohlraum.

5. The target assembly of claim 1, wherein the ablator layer is comprised of beryllium.

6. The target assembly of claim 1, wherein the shell comprises a spherical tungsten shell having a thickness of approximately 0.005 cm.

7. The target assembly of claim 1, wherein the fuel region comprises a sphere of deuterium-tritium gas having a radius of approximately 0.25 cm.

8. The target assembly of claim 1, wherein the foam metal material comprises a low-Z foam filler disposed within the hohlraum that holds the target in an approximate center of the hohlraum.

\* \* \* \* \*